Sept. 3, 1957 W. N. STILWELL 2,804,710
THREADING DEVICE
Filed Oct. 14, 1954 2 Sheets-Sheet 1
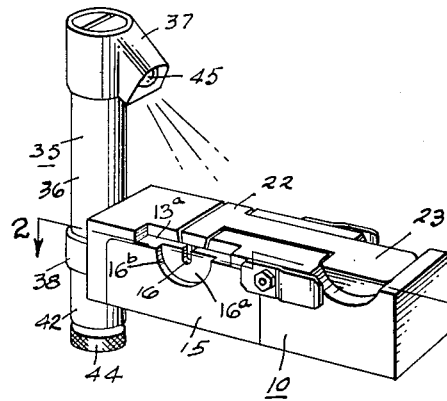
Fig. 1.
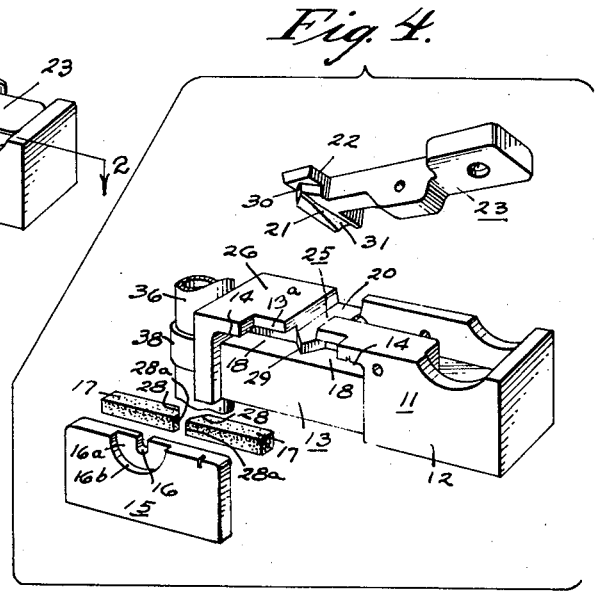
Fig. 4.
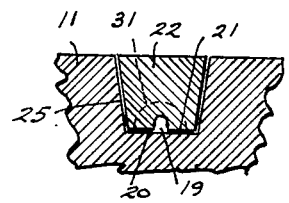
Fig. 3A
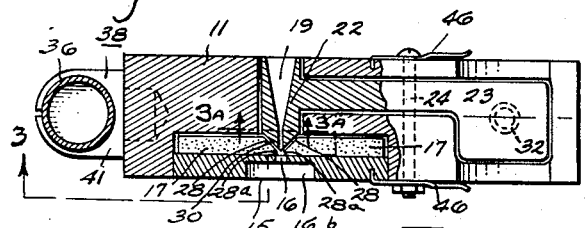
Fig. 2.
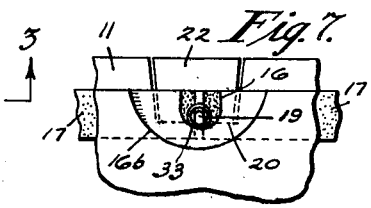
Fig. 7.
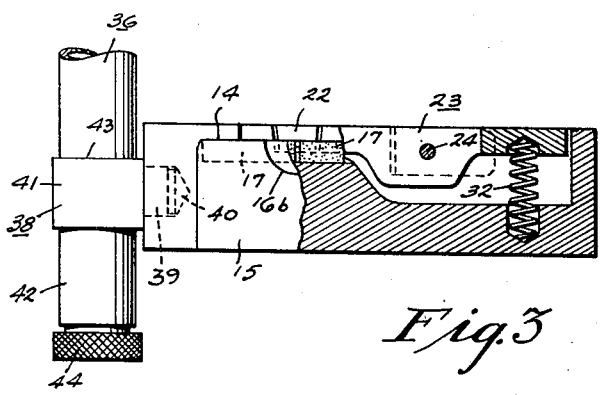
Fig. 3
Fig. 8.
INVENTOR.
WINFRED N. STILWELL
BY
ATTORNEY.

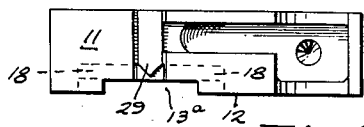
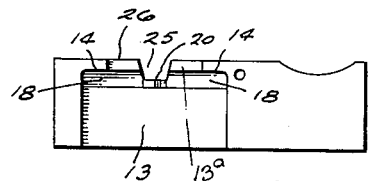
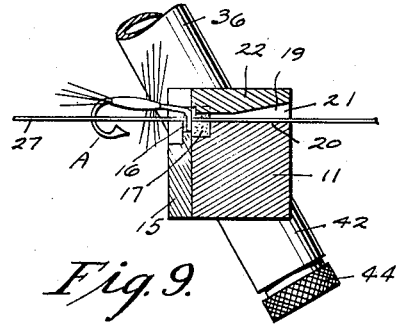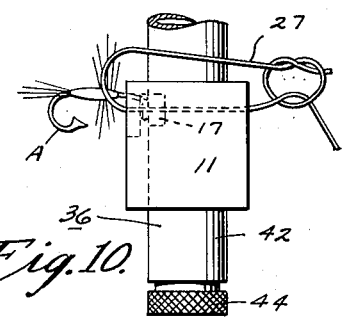
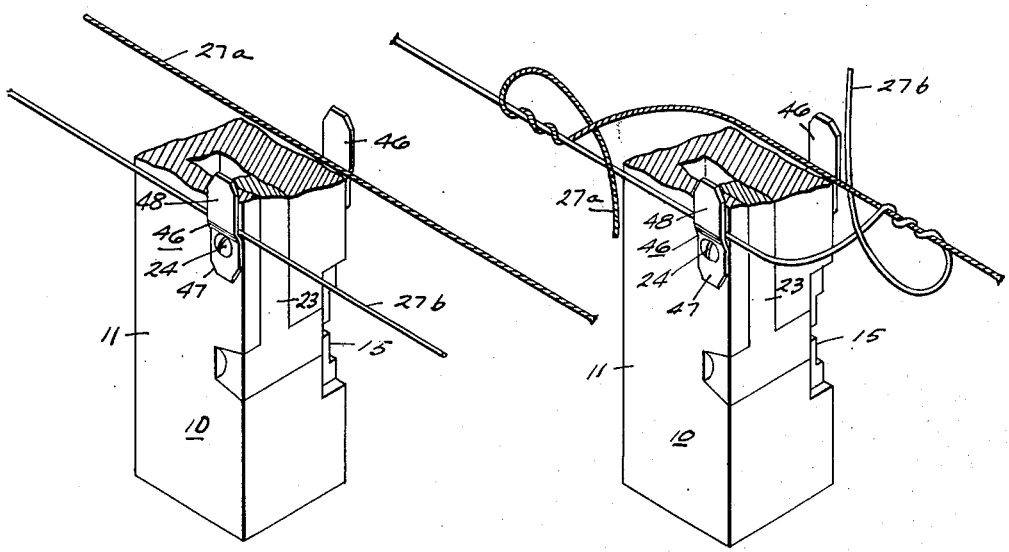
INVENTOR.
WINFRED N. STILWELL
BY
ATTORNEY.

United States Patent Office 2,804,710
Patented Sept. 3, 1957

2,804,710

THREADING DEVICE

Winfred N. Stilwell, Radnor, Pa.

Application October 14, 1954, Serial No. 462,189

5 Claims. (Cl. 43—1)

This invention relates generally to devices for threading a strand of yarn through an eyed element and is more particularly concerned with improvements in devices especially designed to facilitate the threading of a line through the eye of a fishhook and securement of the line to the fishhook. This application is a continuation-in-part of a prior application filed on October 27, 1953, Serial No. 388,600, now abandoned.

A principal object of the present invention is to provide a device having simplified means for positioning the head of a fishhook and holding the same with the eye formed therein effectively in registry with a channel into which the line is initially inserted for support and guidance into the eye, whereby threading of the fishhook is effected expeditiously and with certainty.

Another object of the present invention is to provide such a threading device wherein the simplified hook eye positioning means accommodates any one of a number of different hook heads within a predetermined size range.

Still another object of the present invention is to provide such a threading device wherein a notch adapted to accommodate any one of a number of different hook heads within a predetermined size range is disposed in such relation to a guide channel for a line as to effectively position the eye formed in the head of a fishhook held in the notch in registry with the guide channel to receive the line as it is projected through and emerges from the guide channel.

A further object of the present invention is to incorporate in such a threading device as a component part thereof adjustable means for illuminating the same and additional means for splicing the line.

Other objects and advantages of the present invention will be apparent hereinafter, it being understood that the present invention consists substantially in the combination, construction, location and relative arrangement of parts, all as described in detail hereinafter, as shown in the accompanying drawings and as finally pointed out in the appended claims.

In the accompanying drawings which are illustrative of a preferred embodiment of the present invention:

Figure 1 is a perspective view of a threading device constructed in accordance with the principles of the present invention;

Figure 2 is a plan view of the threading device shown in Figure 1, being partially shown in section;

Figure 3 is an elevational view of the threading device, being partially shown in section as indicated by the line 3—3 of Figure 2;

Figure 3A is a fragmentary vertical enlarged section on line 3A—3A of Figure 2;

Figure 4 is an exploded perspective view of the threading device;

Figure 5 is a plan view of the main body of the threading device;

Figure 6 is a front elevational view of the main body part of the threading device shown in Figure 5;

Figure 7 is a partial elevational view of the threading device showing a hook head held in position and ready for projection of the line therethrough;

Figure 8 is the same as Figure 7 but shows a comparatively large hook head;

Figure 9 is a transverse sectional view of the threading device showing a line projected through the eye formed in the head of a fishhook;

Figure 10 is an end view of the threading device showing a line projected through the eye formed in the head of a fishhook and partially knotted preliminarily to being separated from the threading device;

Figure 11 is a fragmentary prespective view showing two end portions of the line positioned for splicing; and Figure 12 is similar to Figure 11 but shows the splicing knot partially formed.

Referring to the drawings, the threading device as constructed in accordance with and embodying the principles of the present invention essentially comprises an elongated main body assembly designated generally by the numeral 10 and preferably rectangular in transverse cross section. This assembly 10 comprises a main body part 11 in the front side or face 12 of which there is formed a vertically extending recess 13 having at its upper end a restricted passage 13a centered between a pair of shoulders 14—14. The recess 13 snugly receives a plate member 15 which, in any suitable manner, is fixedly secured therein beneath the passage 13a. For locating the eye of any one of a number of different fishhooks within a predetermined size range in position to be threaded with the line to which it is to be secured the upper edge of the plate 15 is provided with a notch 16 the mouth of which presents toward and is in communication with the passage 13a above the plate 15. Preferably, the plate 15 is provided in the region of the notch 16 with a recess 16a the marginal wall 16b of which is spaced from and extends about the notch 16, the recess 16a being of a depth and size adequate to accommodate therein the hackle of the fishhook which is close to the eye of the hook and which might otherwise interfere with proper seating of the hook eye in the notch 15.

Disposed to the rear of the plate member 15 along its upper edge are a pair of permanent magnets 17—17, each of elongated bar form, these magnets being suitably mounted in the main body part 11 with their proximate ends disposed in spaced relation. The mounting of the bar magnets 17—17 is such that the space between the proximate ends of the bar magnets 17—17 preferably is in exact registry with the notch 16 in the plate 15. The bar magnets may be formed of permanent magnetic alloy material, such as "Alnico," manufactured and sold by the Crucible Steel Company of America. Inasmuch as the proximate poles of these bar magnets are of opposite polarity, there is created in the immediate area of the space between the magnets a strong magnetic field.

Any suitable arrangement may be employed for permanently securing the bar magnets in their longitudinally alined spaced relation, for example, by embedding the magnets in suitable recesses 18—18 formed in the main body part 11. The front faces of the bar magnets are disposed parallel to and substantially flush with the base wall of the recess 13 and with the proximate ends thereof respectively projected inwardly of the side edges of the hook head accommodating notch 16 so that upon placement in the notch 16 of a hook head the latter will overlie the projecting ends of the bar magnets and be magnetically held thereby.

In order to insure axial projection of the line through the eye of the magnetically held fishhook, and to facilitate removal of the line with its attached hook from the threading device, the main body assembly 10 is provided with a longitudinally split, line-guiding channel 19 which extends rearwardly of the bar magnets in effective alinement with the eye of the magnetically held fishhook A in position to be threaded. The channel 19 is formed by two coacting surface portions, viz., an upwardly presenting flat surface portion 20 of the main body part 11 and a downwardly presenting grooved surface portion 21 of a head 22 carried by a member 23; the latter being disposed in a recess suitably formed in the main body part 11 and being pivotally mounted for rocking movement about a pivot pin 24 extending transversely of the main body part 11.

The head 22 of the member 23 extends transversely thereof and is undercut along its bottom surface to provide the aforementioned grooved surface portion 21. The coacting plain surface portion 20 which forms the base surface of the channel 19 is a portion of the bottom wall of a channel 25 which extends transversely across the top side or face 26 of the main body part 11 and which snugly receives the complementally shaped head 22 of the pivoted member 23. It is to be noted that the plane of the bottom wall of the channel 25 intersects the vertical inside diameter of the eye of the smallest hook to be accommodated by the notch 16 at a point along the diameter and that the vertical distance between the bottom wall of the channel 25 and the upper extremity of the aforementioned diameter is at least equal to the diameter of the line 27 to be threaded through the eye.

Furthermore, it will be noted that the bar magnets are beveled as at 28—28 and feather down to opposed blunt terminal portions 28a—28a. The front end portion of the bottom wall of the recess 25 is beveled to provide a tapered projection 29 which extends into the space between the angularly related edges 28—28 of the bar magnets 17—17 to a point slightly set back from the base surface of the recess 13. The blunt terminal portions 28a—28a are disposed on opposite sides of the aforementioned tapered projection 29 and are spaced apart thereby a distance preferably not exceeding the inside diameter of the eye of the smallest hook to be threaded with the device of the present invention. The front end of the grooved portion 21 of the pivoted top member 23 is also provided with a tapered projection 30 which is accommodated within the space formed between the angularly related edges 28—28 of the bar magnets when the member 23 is swung into its operative position shown in Figures 1, 2 and 3. The rear end of the grooved portion 21 is flared, as at 31, to provide the channel 19 with an enlarged entrance for the line 27, it being noted that the restricted forward end portion of the said channel is of uniform cross-section and extends rectilinearly through the tapered front end portion 30 of the head 22, the line-guiding channel 19 being thus in registry with the passageway between the bar magnets 17—17 and with the notch 16 of the plate 15.

It will be understood that the correspondingly tapered edges of the pointed projection 29 cooperate with the beveled edges 28—28 of the bar magnets 17—17 to force the latter apart when they are pressed into their recesses 18—18 by the plate 15. By properly relating the shape and/or disposition of the pointed projection 29 to the beveled edges 28—28 of the bar magnets, the latter are cammed apart by the intervening projection 29 to present their proximate ends 28a—28a in the required spaced relation. The bar magnets 17—17 are disposed, of course, with the opposite poles thereof in proximity to one another, so that the natural tendency is for their beveled ends to be drawn together magnetically. However, when the plate 15 is pressed into its seat 13, it bears against the magnets respectively disposed in the recesses 18—18 and forces the beveled edges 28—28 to shift inwardly along the opposite tapered sides of the pointed projection 29 to effect the desired separation of the proximate ends 28a—28a of the magnets. Necessarily, the recesses 18—18 are each of sufficient length and depth to provide for such movement of the bar magnets relatively to each other and to the intervening projection 29 as is required to locate the magnets in their finally adjusted spaced relation.

The pivoted member 23 is normally spring-pressed into its position shown in Figures 1, 2 and 3 by a coiled compression spring 32 suitably set in the main body part 11 to exert a biasing effort against the outer end of the member 23 which tends constantly to resiliently seat the head 22 in its accommodating recess 25. It will be apparent that upon depressing the outer end of the member 23 against the force of the spring 32, the head 22 of the pivoted member 23 will be raised to separate the surface portions 20 and 21 which coact to form the channel 19 and thereby permit lateral removal of the line 27 from the channel after the line has been threaded through and attached to the eye of the fishhook. In this connection, it will be noted that the passageway between the bar magnets is freely open at the top thereof as is the hook eye-accommodating notch 16 which is in registry with the passageway, so that upon raising the head 22 of the member 23, the line 27 is free to be removed from the threading device by lateral shifting of that portion of the line which was extended through the line-guiding channel 19.

Preferably, the flared portion of the line-guiding channel 19 is only of such axial length as to facilitate feed of the line 27 into the channel and thence to and through the bar magnets and the eye of the fishhook magnetically held in registry with the channel, it being desirable that the channel include a portion which is axially straight and of uniform diameter to insure rectilinear projection of the inner end of the line 27 to and through the eye of the magnetically held fishhook.

It is, of course, preferable that all parts of the device located in close association with the permanent magnet assembly be made of non-magnetic material, as for example, aluminum or other nonferrous metal or suitable plastic composition, thereby insuring against the formation of strong magnetic fields which might reduce the magnetic attraction of the bar magnets for the eyed element supported thereby.

In certain instances it may be desirable to employ a single bar magnet in lieu of a pair of magnets as shown, in which case said single bar magnet would be provided intermediate its ends with an upwardly presenting open-ended notch for free projection of the line through the magnet and the eye of the hook held in position thereby. Where such single magnet is employed, the rear face thereof, immediately below and in line with said notch, is preferably indented to provide a V-shaped recess corresponding to that formed by the angularly related edges 28—28 of the bar magnets 17—17 as shown in the drawings, which recess is designed to accommodate therein the pointed projection 29. The latter thus serves not only to locate the magnet in position with its notch in registry with the notch 16 of the plate 15 and the line-guiding channel 19 hereinbefore described, but also to provide for forward extension of said channel to a point as close as possible to the notch 16 in the plate 15, thereby insuring axial projection of the line through the eye of the hook to be threaded with the line.

It will be apparent that in the operation of the device as so far described, the head of the fishhook to be threaded is seated in the notch 16 and pressed toward the bar magnets which magnetically hold the hook head securely in position with its eye in effective registry with the channel 19. The line 27 is then projected through the channel, the passageway between the bar magnets, and the eye, as shown in Figure 9, whereupon the projected end of the line may be looped about the hook head and tied thereto by any suitable tying knot, as shown in Figure 10.

Referring particularly to Figure 7, the smallest hook head to be threaded is designated by the number 33; and referring particularly to Figure 8, the largest hook head to be threaded is designated by the numeral 34. It will be noted that the notch 16 overlies the proximate beveled ends of the bar magnets 17—17 and that the width of the notch exceeds somewhat that of the space between the magnets, in consequence of which the proximate ends of the latter respectively project inwardly beyond the opposite side edges of the notch 16. Thus, the maximum strength of the magnetic field is within the area of the notch 16, so much so that any hook head of a size adapted to be received within the notch and overlie the freely projecting ends of the magnets is automatically centered between the latter and thereby magnetically retained in position with its eye in exact registry with the space between the magnets and with the line-guiding channel 19.

Thus, by forming the notch 16 of a width of 0.080 inch and of such depth that its curved bottom end does not project more than 0.009 inch below the plane of the base surface of the line-guiding channel 19, such notch may accommodate various sizes of hooks having heads which range in outside diameter from 0.080 inch to 0.044 inch and in inside diameter from 0.033 inch to 0.018 inch. When the head of a hook within this size range is positioned in the notch, it will be securely held in place by the magnetic attraction of the bar magnets 17—17 and will extend sufficiently above the base surface of the line-guiding channel to permit threading of a line of correct gauge through the hook eye. Of course, the sizes and disposition of the hook head receiving notch 16 may be varied as desired to accommodate sizes of hook heads different from those above mentioned.

It is important for proper operation of the threading device of the present invention that the transverse width of the gap formed between the bar magnets 17—17 (or in a single bar magnet where such is employed in lieu of a pair of magnets as shown) be substantially less than the overall transverse dimension of the smallest hook eye which is accommodated in the notch 16, so that the opposite edges of the eye respectively overlie the spaced portions of the magnets which project inwardly beyond the opposite side edges of the notch 16. Thus, when the hook eye is disposed in the bottom of the notch 16 in overlying relation to the portions of the magnet exposed by the notch 16, the eye is so subjected to the magnetic forces operable on opposite sides of the gap that it automatically shifts into centered position relatively to the magnetic field and so presents its axis in registry with the line-guiding channel 19. To facilitate this desired action, the bottom of the notch 16 is preferably rounded, as shown, so that when the hook eye is placed in the notch and pressed downwardly into the bottom thereof, the eye is automatically shifted by the curvature of the bottom edge of the notch to locate the center of the eye in approximate coincidence with the center of the notch 16 and accordingly the center of the magnet gap, whereupon the magnet itself operates with maximum force and effect to accurately center the hook eye in position to be threaded with line projected through the line-guiding channel 19. In this connection, it will be noted that the forward end of this channel, as appears most clearly in Figures 2 and 9, terminates at a point very closely adjoining the vertical plane of the eye of the hook to be threaded, thereby insuring rectilinear projection of the line through the center of any eye which may be disposed in the notch 16 and which is securely held in line-threading position by the attraction force of the magnet.

For illuminating the main body assembly 10 to facilitate use thereof in the dark for the purpose intended, as when fishing at night, there is provided, as a component part of the threading device, a flashlight designated generally by the numeral 35 and comprising a cylindrical casing 36 mounting a head 37 and comprising a fitting 38 through the medium of which the casing 36 is secured to one end of the main body assembly 10. The fitting 38 is provided with a laterally projecting shank 39 which is adapted to be removably fitted into an opening 40 formed in one end of the main body part 11, said fitting 38 being in the form of a split annular member 41 ad receive a reduced diameter portion 42 of It will be noted that the casing 36 is turnable fitting 38 about its own axis and also is axially shift in the fitting 38, being frictionally secured in any adjusted position and being limited in the aforementioned axial shifting movement by a suitable shoulder 43 and a nut 44 as will be evident. In addition, the fitting 38 and the casing 36 may be swung as a unit about the axis of the shank 39. Accordingly, the position of the head 37 of the casing 36 may be adjusted as desired to direct the light from its bulb 45 not only for most efficient illumination of the device during nighttime use thereof but also for general use as a flashlight.

The threading device of the present invention may also include means for facilitating the splicing together of two ends of a fishing line. Thus, as best shown in Figures 1, 2, 11 and 12, the main body member 11 may be provided with a pair of leaf spring members 46—46 respectively mounted on opposite faces of the member 11 and secured thereto by the opposite ends of the pivot pin 24. The members 46—46 are provided with inwardly extending corresponding end portions 47—47 which are suitably embedded in the main body part 11 and the plate member 15 to secure the members 46—46 against movement about the axis of the pivot pin 24. The corresponding opposite end portions 48—48 of the members 46—46 are suitably offset outwardly from the main body part 11 for receiving between the portions 48—48 and respectively the front and rear faces of the main body part 11 portions 27a and 27b of a line to be spliced, as shown in Figure 11. For splicing portions 27a and 27b, the ends thereof are each turned about the other several times to conjointly form a loop around the main body assembly 10. Then the free ends are projected through the loop, as shown in Figure 12, whereupon the main body assembly is slipped out of the loop and the interconnected portions of the line drawn tight to form the desired splice.

It will be apparent that the device of the present invention is applicable for the threading of eyed elements other than fishhooks, as, for example, needles and awls having small diameter yarn or thread-receiving eyes, and accordingly, it will be understood that the device is not necessarily limited in its use to the threading of eyed fishhooks and the like.

Also, it will be understood, of course, that the present invention is susceptible of various changes and modifications which may be made from time to time without departing from the real spirit or principle thereof, and it is accordingly intended to claim the same broadly, as well as specifically, as indicated by the appended claims.

What is claimed as new and useful is:

1. In a threading device of the character described, a main body assembly having a line-guiding bore extending transversely therethrough, a plate member side abutting said main body and disposed at one end of said bore with an open notch formed in one edge thereof registering with said bore, and a pair of mutually attracted elongated magnetic elements carried by said main body in side abutting relation to said plate, on opposite sides of said bore, said magnetic elements being respectively provided with proximate end portions having opposed end surfaces that diverge axially of said bore, away from said plate member, said main body having formed between said diverging surfaces of the magnetic elements a complementally shaped portion underlying said bore and coacting with said plate member to secure said magnetic elements in fixed predetermined spaced relation to form a passage in continuation of said guide bore, said notch being adapted for locating an eyed element of wire stock in position to be attracted by said magnetic elements and supported thereby with the eye of the element in axial alinement with said passage and guide bore.

2. In a device of the character defined in claim 1 wherein the proximate end portions of the magnetic elements ...at are ...ing the proximate... magnetic elements and underlying the line-guiding bore is provided with surfaces that diverge axially of said bore, away from the plate member and respectively abut the diverging surfaces of the magnetic elements whereby to coact with said plate member for separating said blunt opposed terminal surfaces of the magnetic elements.

3. In a device of the character defined in claim 2 wherein the main body portion intervening the proximate end portions of the magnetic elements and underlying the line-guiding bore is disposed in spaced close relation to the plate member.

4. In a device of the character defined in claim 1 wherein the open notch formed in the plate member has opposed side walls disposed respectively on opposite sides of the line-guiding bore, and each side wall aforesaid is set back from the axis of said bore a distance sufficient for fully exposing the end portion of the underlying magnetic element for direct contact with the eyed element to be attracted and supported thereby.

5. In a device of the character defined in claim 1 wherein the open notch formed in the plate member has opposed side walls connected by a rounded bottom wall, the walls aforesaid extending about the line-guiding bore axis in such spaced relation thereto that the proximate end portions of the magnetic elements are fully exposed for direct contact with the eyed element to be attracted and supported thereby, and the rounded bottom wall of the notch is laterally spaced from the bottom of said line-guiding bore a distance closely approximating the diameter of the wire stock out of which the eyed element is made, the eye of the element to be threaded being defined by a hooked end portion of the element.

References Cited in the file of this patent

UNITED STATES PATENTS

| | | |
|---|---|---|
| 538,479 | Borradaile | Apr. 30, 1895 |
| 606,269 | Bowman | June 28, 1898 |
| 1,147,656 | Spear | July 20, 1915 |
| 2,354,853 | Dobbs | Aug. 1, 1944 |
| 2,498,920 | Holland | Feb. 28, 1950 |
| 2,596,214 | Corkran | May 13, 1952 |
| 2,682,126 | Shepherd | June 29, 1954 |
| 2,701,669 | David | Feb. 8, 1955 |

FOREIGN PATENTS

| | | |
|---|---|---|
| 603,464 | Great Britain | June 16, 1948 |